T. SHEPPARD.
DIRIGIBLE FENDER FOR STREET CARS.
APPLICATION FILED MAR. 3, 1914. RENEWED NOV. 27, 1915.
1,168,970.
Patented Jan. 18, 1916.
2 SHEETS—SHEET 1.
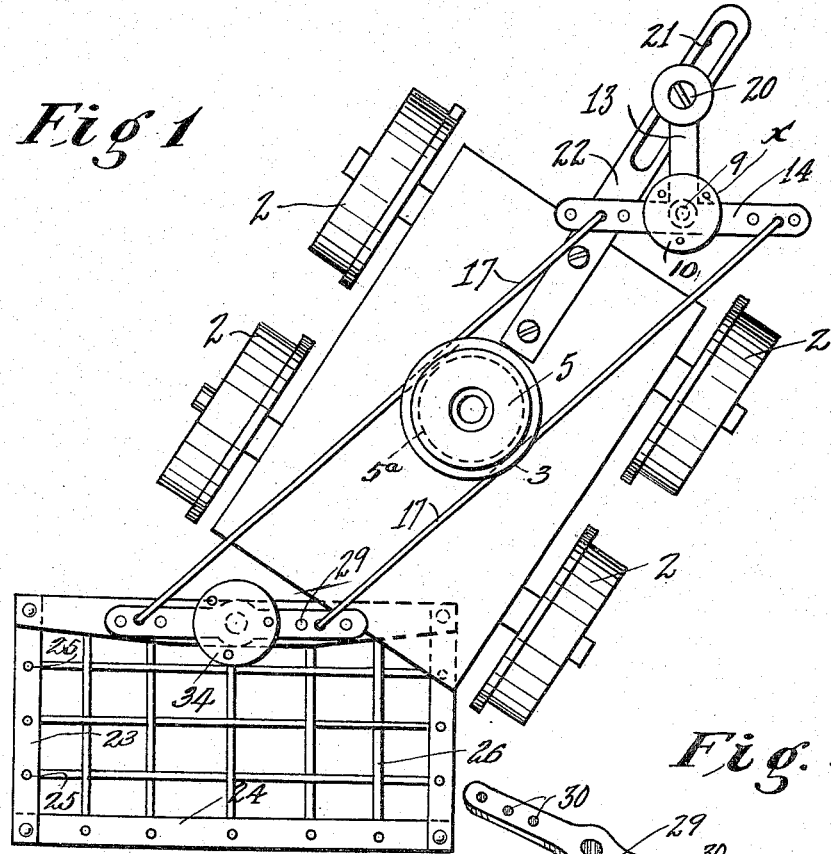
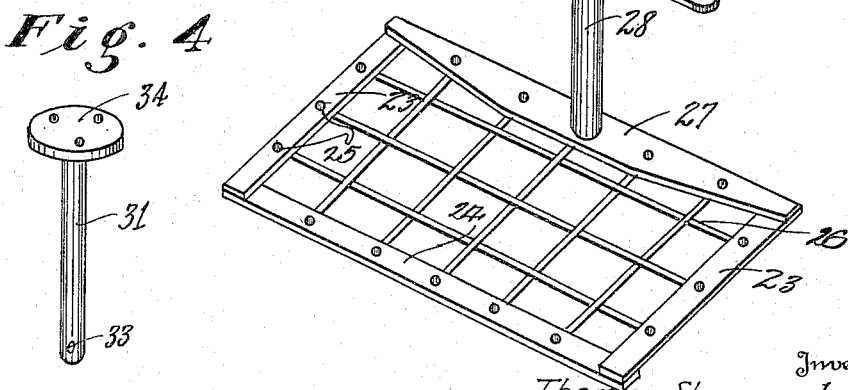
Inventor
Thomas Sheppard

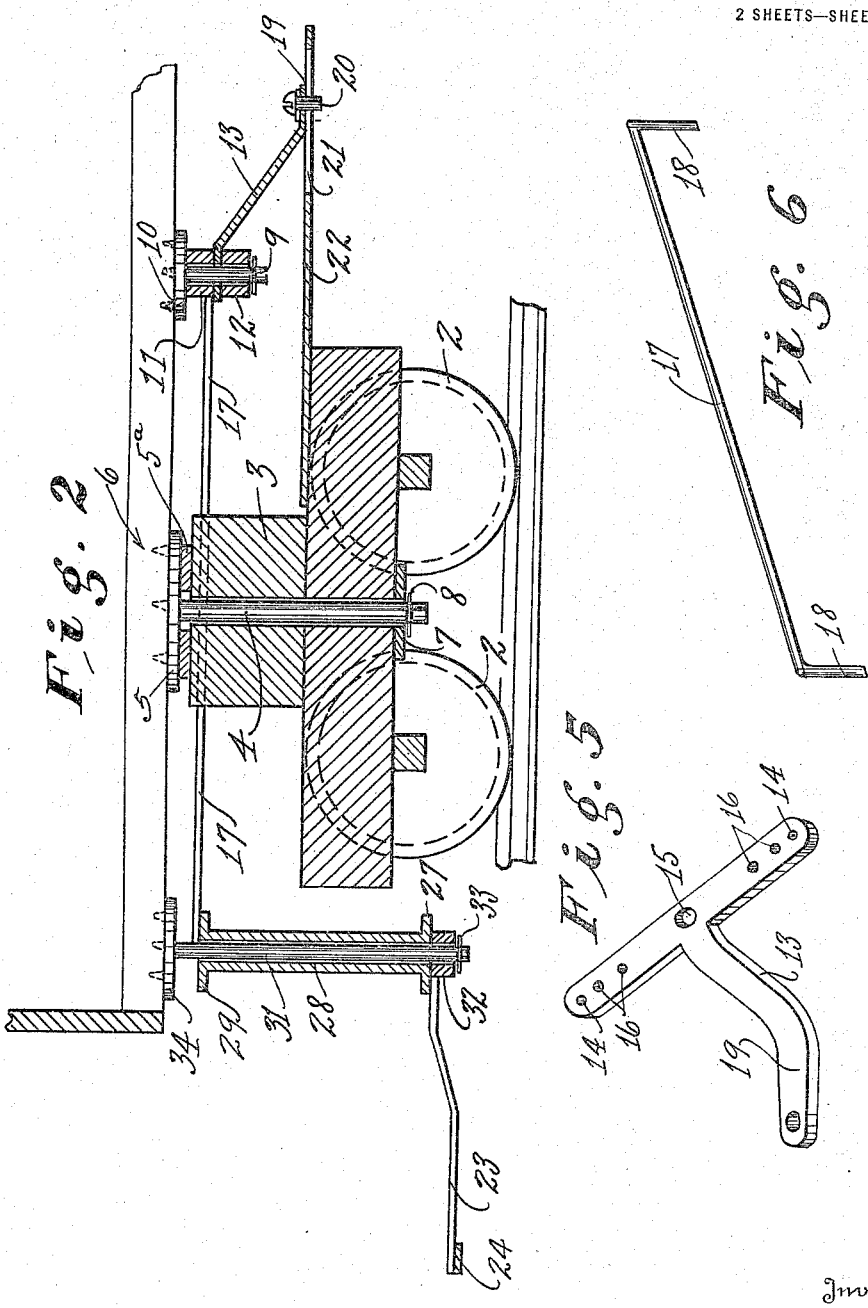

UNITED STATES PATENT OFFICE.

THOMAS SHEPPARD, OF AGNEWVILLE, VIRGINIA.

DIRIGIBLE FENDER FOR STREET-CARS.

1,168,970. Specification of Letters Patent. Patented Jan. 18, 1916.

Application filed March 3, 1914, Serial No. 822,198. Renewed November 27, 1915. Serial No. 63,905.

*To all whom it may concern:*

Be it known that I, THOMAS SHEPPARD, a citizen of the United States, residing at Agnewville, in the county of Prince William and State of Virginia, have invented certain new and useful Improvements in Dirigible Fenders for Street-Cars; and I do hereby declare the following to be a full, clear, and exact description of the invention, such as will enable others skilled in the art to which it appertains to make and use the same.

This invention relates to dirigible fenders for street cars, and one of the principal objects of the invention is to provide a fender and means for turning said fender to one side or the other automatically when the car is rounding curves.

The car fenders in general use are rigidly connected to the front portion of the car, and in turning corners or in rounding curves the fender is almost useless, and many instances result in accidents which might be avoided.

This invention is designed for the purpose of overcoming the defects in car fenders heretofore existing, and to provide reliable and efficient means for turning the fender in the direction in which the car is traveling in rounding curves or turning corners, the mechanism for operating the fender being entirely automatic.

These and other objects may be attained by means of the construction illustrated in the accompanying drawings, in which, Figure 1 is a top plan view of a fender and its automatic operating mechanism made in accordance with this invention, taken along a horizontal plane along the bottom of the floor of the car, Fig. 2 is a longitudinal sectional view of the same, Fig. 3 is a perspective view of the fender frame and standards, Fig. 4 is a detail perspective view of the standards for supporting the fender, Fig. 5 is a detail perspective view of the steering arm or tiller, and Fig. 6 is a perspective view of one of the connecting rods between the two steering elements or tillers.

Referring to the drawings, the numeral 1 designates the truck, 2 the wheels, 3 the bolster or bearing block, and 4 is a pivotal element for the truck 1, comprising a rod or shaft extending through the block 3 and through the truck 1. The upper end of the rod is provided with a circular plate 5 which rests upon a bearing plate $5^a$ and which is suitably connected to the floor 6 of the car by screws or other fastenings, a washer 7 underneath the truck surrounding the opening through which the element 4 extends and a cotter pin 8 serving to hold the parts in place and permitting their ready removal.

Connected underneath the floor 6 of the car in rear of the standard 4 is a fulcrum pin 9 provided with a connecting face plate 10 secured underneath the floor of the car. Pivoted between the washers 11 and 12 on the fulcrum pin 9 is a tiller or steering element 13, having oppositely extending arms 14 and provided with a central perforation 15 through which the fulcrum pin 9 extends, and a series of perforations 16 for adjustment of the connecting rods 17, which are provided with downwardly turned ends 18. The tiller 13 is provided with a terminal clip 19 which is pivotally connected to a pin 20 mounted to move in a slot 21 formed in a bar 22 extending rearwardly from the truck 1 and connected to the upper surface thereof in any suitable manner.

The fender frame is of rectangular form and consists of flat metal bars 23 and 24 provided with perforations 25 for securing the netting 26 in place. Rigidly mounted on the rear bar 27 of the fender frame is a sleeve 28 to which is connected at its upper end a crossbar 29, the opposite arms of which are provided with perforations 30 in which the connecting rods 17 may be adjustably supported.

A standard 31 extends through the sleeve 28 and is provided with a washer 32 at its lower end, and a cotter pin 33 extends through the standard 31 to hold the parts in place. The upper end of the standard 31 is provided with a face plate 34 rigidly attached underneath the front portion of the floor 6 of the car.

The operation of the invention may be briefly described as follows: When the car rounds a curve toward the right upon the pivotal point 4, the truck 1 turns relatively to the floor 6 of the car, and hence, the slotted bar 22 is moved to the left to throw the tiller 13 to the right. The parallel connecting rods 17 will then move the crossbar 29 to a position parallel with the arm 14, thus swinging the bar 24 to the right. Upon reference to Fig. 1 it will be seen that the truck 1 is moving around a curve to the left. It will be noted that the fender is moved in position to extend out beyond the wheels on the side to which the car is turning.

From the foregoing it will be obvious that a car fender made in accordance with this invention is entirely automatic in its operation and the fender will be moved in the direction of the movement of the car in rounding curves.

Various changes may be made in the details of construction without departing from the spirit and scope of the invention as defined in the claims.

What is claimed is:—

1. An automatically operated dirigible car fender, comprising a fender pivotally mounted underneath the front of a car, a wheel truck pivotally mounted under the car, a slotted bar extending from said truck, a tiller pivotally mounted in the slot of said bar, a front tiller rigidly connected to the fender frame, and parallel connecting bars pivoted at their ends in said tillers, whereby the fender frame is moved upon its pivotal point in the direction of movement of the car in rounding curves.

2. An automatically operable car fender comprising a rectangular frame, a sleeve rigidly connected to one of the bars of the frame, a standard projecting through said sleeve, said standard being rigidly connected to the car frame, a tiller on the upper end of said sleeve, a wheel truck carrying a slotted bar, a tiller pivotally connected in the slot of said bar and provided with oppositely extending arms at the upper end thereof, and connecting rods attached to the tillers at their ends for moving the fender on its pivotal point in the direction of movement of the car in rounding curves.

In testimony whereof I affix my signature in presence of two witnesses.

THOMAS SHEPPARD.

Witnesses:
E. S. BROCKETT,
R. C. HAMMILL.

Copies of this patent may be obtained for five cents each, by addressing the "Commissioner of Patents, Washington, D. C."